(12) United States Patent
Traballano

(10) Patent No.: US 10,995,638 B2
(45) Date of Patent: May 4, 2021

(54) METHOD FOR DIAGNOSING THE VALVE TIMING OF AN INTERNAL COMBUSTION ENGINE

(71) Applicant: Robert Bosch GmbH, Stuttgart (DE)

(72) Inventor: Domenico Traballano, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/414,200

(22) Filed: May 16, 2019

(65) Prior Publication Data

US 2019/0360365 A1 Nov. 28, 2019

(30) Foreign Application Priority Data

May 23, 2018 (DE) .......................... 102018208037.2

(51) Int. Cl.
*F01L 1/344* (2006.01)
*F02D 41/00* (2006.01)

(52) U.S. Cl.
CPC .......... *F01L 1/344* (2013.01); *F02D 41/0002* (2013.01); *F01L 2800/11* (2013.01)

(58) Field of Classification Search
CPC . B23P 2700/07; F01L 1/344; F01L 2013/113; F01L 2013/115; F01L 2303/02; F01L 2800/09; F01L 2800/11; F01L 2800/14; F01L 2800/17; F01L 2820/042; F01L 2820/043; F02D 41/2432; F02D 2200/0402; F02D 2200/0404; F02D 2200/0406; F02D 2200/0408
USPC ....................................................... 123/90.17
See application file for complete search history.

(56) References Cited

U.S. PATENT DOCUMENTS

| | | | | |
|---|---|---|---|---|
| 5,689,067 A | * | 11/1997 | Klein | ........................ F01L 1/02 123/90.17 |
| 2004/0011329 A1 | * | 1/2004 | Grossmann | ......... F02D 41/0055 123/399 |
| 2006/0096361 A1 | * | 5/2006 | Tokugawa | ............ F02D 41/045 73/114.24 |
| 2006/0118086 A1 | * | 6/2006 | Schwulst | ............ F02D 41/0097 123/406.47 |
| 2006/0229797 A1 | * | 10/2006 | Sawada | ..................... F01L 1/34 701/114 |
| 2007/0113827 A1 | * | 5/2007 | Moriya | ................... F02D 41/18 123/435 |
| 2008/0236267 A1 | * | 10/2008 | Hartmann | ............. F02D 41/221 73/114.37 |
| 2013/0231843 A1 | * | 9/2013 | Nakagawa | .......... F02D 41/0002 701/102 |
| 2016/0131071 A1 | * | 5/2016 | Sugimoto | ........... F02D 41/1498 123/436 |
| 2017/0175660 A1 | * | 6/2017 | Pursifull | ............ F02D 41/0002 |

(Continued)

*Primary Examiner* — Jorge L Leon, Jr.
(74) *Attorney, Agent, or Firm* — Norton Rose Fulbright US LLP; Gerard Messina

(57) ABSTRACT

A method for diagnosing the valve timing of an internal combustion engine, a characteristic curve of an actual intake manifold pressure signal being ascertained as a function of a crankshaft signal, the characteristic curve of the actual intake manifold pressure signal being compared to a characteristic curve of a setpoint intake manifold pressure signal and a shift of the valve timing being diagnosed in the event of a specifiable deviation of the actual intake manifold pressure signal from the setpoint intake manifold pressure signal.

15 Claims, 2 Drawing Sheets

(56) References Cited

U.S. PATENT DOCUMENTS

2017/0198649 A1* 7/2017 Kainz ................. F02D 41/2432
2018/0051598 A1* 2/2018 Pedro ................. F02D 41/2464

* cited by examiner

METHOD FOR DIAGNOSING THE VALVE TIMING OF AN INTERNAL COMBUSTION ENGINE

RELATED APPLICATION INFORMATION

The present application claims priority to and the benefit of German patent application no. 10 2018 208 037.2, which was filed in Germany on May 23, 2018, the disclosure of which is incorporated herein by reference.

FIELD OF THE INVENTION

The present invention relates to a method for diagnosing the valve timing of an internal combustion engine.

BACKGROUND INFORMATION

In modern vehicles, the valve timing system is an important component for optimizing the internal combustion engine. The valve timing system is a control system that controls the valves in a reciprocating engine and consequently the charge exchange by opening and closing the air intake and exhaust gas outlet ducts. It is used in almost all four-stroke engines. For this purpose, a valve is opened by a camshaft via a cam and is normally closed again by the pressure force of a spring. When a valve opens and closes has a considerable influence on the mixture to be ignited and therefore also on the exhaust gases correspondingly formed during the combustion.

Currently, an unintended shift of the opening and closing times may be ascertained by detecting and shifting the sensed pattern of a camshaft sensor wheel. Ascertaining a shift of the valve timing is legally required because of its relevance for emissions.

SUMMARY OF THE INVENTION

In a first aspect, a method for diagnosing the valve timing of an internal combustion engine is presented, a characteristic curve of an actual intake manifold pressure signal being ascertained as a function of a crankshaft signal, the characteristic curve of the actual intake manifold pressure signal being compared to a characteristic curve of a setpoint intake manifold pressure signal, and a shift of the valve timing being diagnosed in the event of a specifiable deviation of the actual intake manifold pressure signal from the setpoint intake manifold pressure signal.

The method has the particular advantage of making it possible to detect a change in the valve timing on the basis of a comparison of a characteristic curve of the actual intake manifold pressure with the characteristic curve of a setpoint intake manifold pressure. The opening and closing times of the valves form characteristic features within the intake manifold pressure signal. A change in the valve timing, for example due to a toothed belt or timing chain jump, may therefore be detected directly on the basis of the deviation of the actual intake manifold pressure signal from a setpoint intake manifold pressure signal. It is possible to diagnose the changes in the correlation of the intake manifold pressure signal with the specific crankshaft position. From the comparison of the characteristic curve of the actual intake manifold pressure and the characteristic curve of the setpoint intake manifold pressure, it is possible to determine a deviation so that a shift between the two characteristic curves may be detected.

It is furthermore advantageous if the actual intake manifold pressure signal is ascertained by an intake manifold pressure sensor, as this makes it possible to save a camshaft sensor since a diagnosis of the valve timing may be performed by the intake manifold pressure sensor.

In one advantageous refinement, the intake manifold pressure signal may be modeled by a hot film air mass sensor signal and a throttle valve signal. This is advantageous for systems in which no intake manifold pressure sensor is installed. Other sensors are also conceivable for modeling the intake manifold pressure signal, for example temperature sensors or other pressure sensors.

Furthermore, there may be a provision for the deviation to be ascertained on the basis of a characteristic feature of the characteristic curve of the actual intake manifold pressure and of the setpoint intake manifold pressure. The openings and closings of the valves leave characteristic features in the signal of the intake manifold pressure.

One advantageous refinement may provide for the characteristic feature to correspond to a minimum and/or a maximum of the actual intake manifold pressure and/or of the setpoint intake manifold pressure. The minimum and maximum represent favorable points for a comparison of the signals. These characteristic points of comparison may be readily determined computationally, for example by a control unit, and used for the method.

Furthermore, there may be a provision for the characteristic feature to correspond to a specifiable crankshaft position.

An alternative refinement may provide for the characteristic feature to correspond to a gradient as a function of the actual intake manifold pressure and/or of the setpoint intake manifold pressure.

It is advantageous that the internal combustion engine is switched to an emergency operating mode in the event that a deviation is detected. This makes it possible to avoid damage to the internal combustion engine.

One advantageous refinement provides for the operating state to be a steady-state operating state, which may be an idling operating state or a specifiable load state of the internal combustion engine.

In other aspects, the present invention relates to a device, in particular a control unit and a computer program, which are configured, in particular programmed, for carrying out one of the methods. In yet another aspect, the present invention relates to a machine-readable storage medium, on which the computer program is stored.

The present invention is described in more detail below with reference to the appended drawings and on the basis of exemplary embodiments.

DETAILED DESCRIPTION

Figure 1:
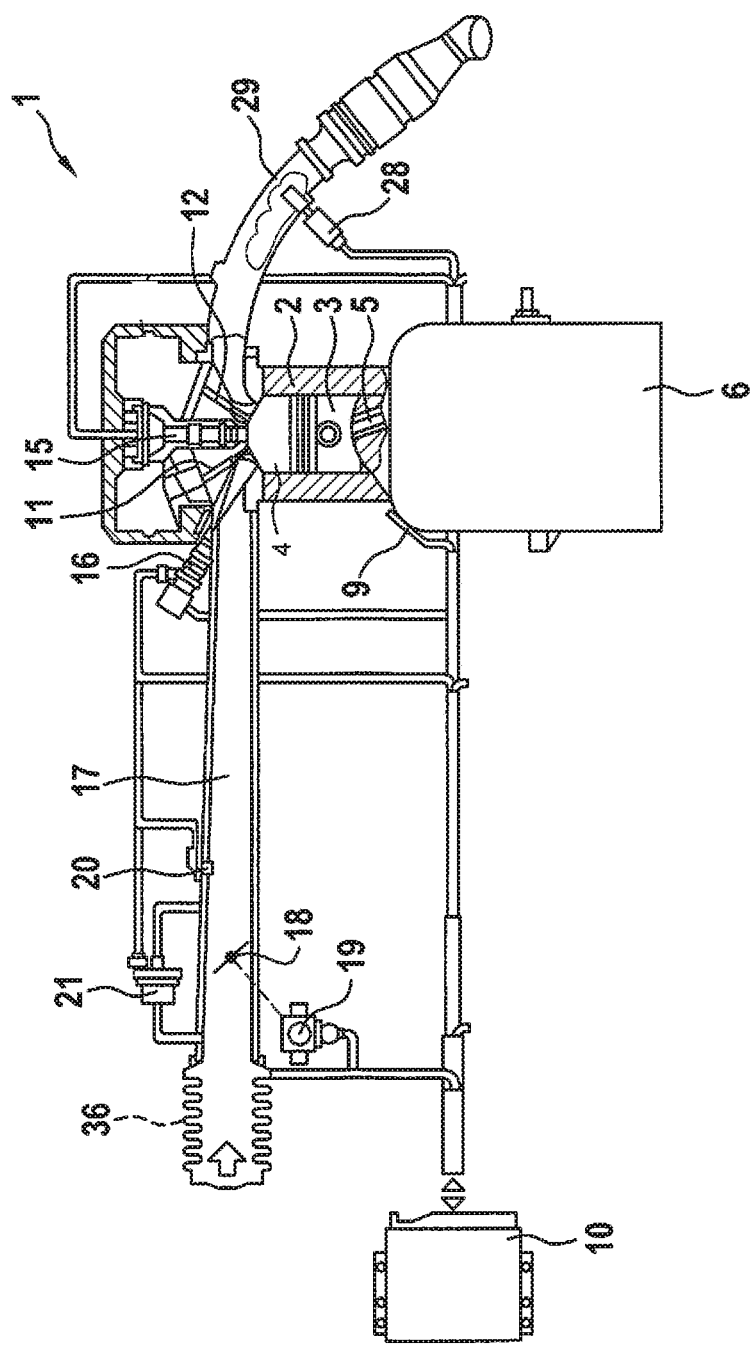
FIG. 1 shows a schematic representation of an internal combustion engine.

FIG. 1 shows a schematic representation of an internal combustion engine 1 having a cylinder 2, which together with a piston 3 encloses a combustion chamber 4. Piston 3 is connected by a connecting rod 5 in a known manner to a crankshaft 6 (not represented in detail). A crankshaft sensor 9 may ascertain the crankshaft information, for example the angle clock information (including the phase). The electrical signal of the crankshaft sensor 9 is supplied to an electronic control unit 10. FIG. 1 shows a four-stroke spark-ignition engine, which furthermore comprises at least one intake valve 11 and at least one exhaust valve 12, which are for example actuated by a camshaft (not shown here), for example by way of cams or the like. The camshaft is in this case driven via crankshaft 6, for example via a toothed belt or via a timing chain. If the toothed belt wears out, for example because of aging effects, or the timing chain links lengthen, the valve timing may be shifted. In the worst case, this may result in engine damage. Furthermore, a rotational speed sensor is disposed on crankshaft 6, which is able to ascertain the rotational speed of internal combustion engine 1.

The electrical signal of the rotational speed sensor is supplied to an electronic control unit 10. A spark plug 15 is used in a known manner to ignite the mixture, and an injection nozzle 16, which for example injects into the intake duct 17 just upstream from intake valve 11, is used to form the mixture. A throttle valve 18 may furthermore be situated in intake duct 17, which is connected to a throttle valve position sensor 19 which is in turn able to transmit an electrical signal to control unit 10. Furthermore, an intake manifold pressure sensor 20 is situated in intake duct 17, which is able to measure the pressure in intake duct 17 and transmit it to control unit 10. Intake manifold pressure sensor 20 is in this case situated downstream from throttle valve 18 and upstream from the intake valve 11.

As an alternative or in addition to intake manifold pressure sensor 20, a hot film air mass sensor 36 may also be installed in intake duct 17, which is able to measure the pressure in intake duct 17 and transmit it to control unit 10. The hot film air mass sensor 36 may be situated downstream from the air intake of the intake duct and upstream from throttle valve 18. A bypass 21, electrically controllable by control unit 10, is used for idle speed control. Not shown in the present exemplary embodiment is a starter, which, for example, as is known in the related art, may be connected via a freewheeling gear or an electrically switchable clutch to the crankshaft of internal combustion engine 1 and comprises an electric motor which is used to start internal combustion engine 1. In the open state, exhaust valve 12 connects combustion chamber 4 to an exhaust 29, which releases the combustion gases with sound attenuation to the environment. A lambda probe 28 is situated on exhaust 29, which measures the residual oxygen in the exhaust gases and thus measures the air/oxygen ratio $\lambda$ on which the combustion is based, and transmits it as an electrical signal to electronic control unit 10. Alternatively or additionally, the internal combustion engine may also be a supercharged internal combustion engine.

Figure 2:
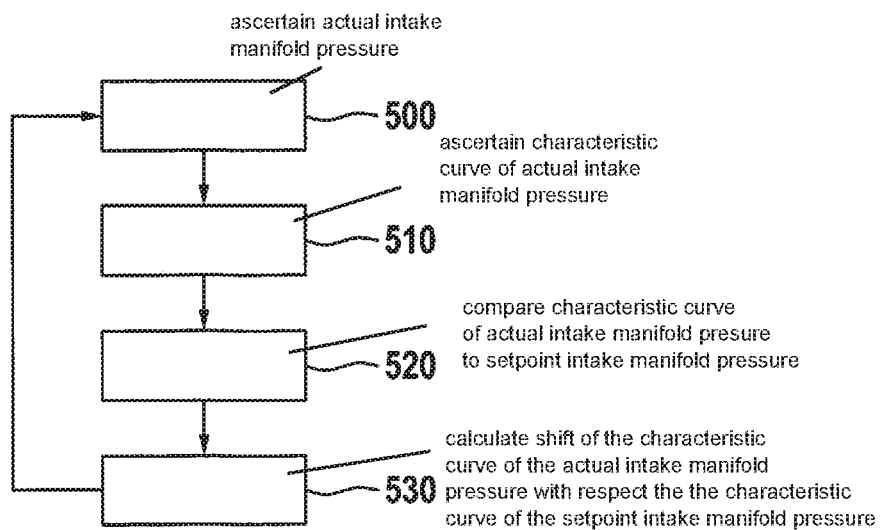
FIG. 2 shows a first exemplary embodiment of the sequence of the method for diagnosing the valve timing of an internal combustion engine.

FIG. 2 shows the exemplary sequence of the method for diagnosing the valve timing of an internal combustion engine 1 in a first exemplary embodiment.

In a first step 500, an intake manifold pressure sensor 20 ascertains an actual intake manifold pressure signal, in particular an actual pressure signal, in intake line 17. The signal ascertained by intake manifold pressure sensor 20 may be received and stored by a control unit 10. The transmission of the signal may occur in wired or wireless fashion.

Alternatively or additionally, the actual intake manifold pressure signal in the intake line 17 may also be modeled by a hot film air mass sensor 36 as a function of the throttle valve position signal.

In a step 510, the ascertained actual pressure signal is correlated with the crankshaft position. For this purpose, the crankshaft angle ascertained by the crankshaft sensor is compared to the ascertained actual pressure signal, so that an actual characteristic curve of the intake manifold pressure may be ascertained as a function of the crankshaft signal and thus of the crankshaft angle. The crankshaft signal may be provided as a square wave voltage signal and may be converted by control unit 10 into an angle range between 0° and 720°.

The characteristic curve of the actual intake manifold pressure may in this case be ascertained over a time range having a specifiable start time and a specifiable end time, and received and stored by control unit 10. Alternatively or additionally, it is also possible to start the ascertainment of the characteristic curve only when e.g. a specifiable operating state of internal combustion engine 1 is reached. The specifiable operating state may be a steady-state or quasi-steady-state operating state, e.g. an idling state of the internal combustion engine. Further possible operating states are operating states having an approximately constant load or constant rotational speed of internal combustion engine 1.

In a step 520, the characteristic curve of the actual intake manifold pressure is compared to a characteristic curve of the setpoint intake manifold pressure. The characteristic curve of the setpoint intake manifold pressure as a function of the crankshaft signal may be ascertained for example on a test stand or on a vehicle for different operating states of internal combustion engine 1 and stored in control unit 10. The characteristic curve of the setpoint intake manifold pressure may be stored in a characteristics map in control unit 10.

In the subsequent step 530, a calculation is performed of a shift of the characteristic curve of the actual intake manifold pressure with respect to the characteristic curve of the setpoint intake manifold pressure. This may be achieved by subtracting one characteristic curve from the other, for example. To this end, it is possible to ascertain a characteristic feature, for example a maximum or a minimum, in the characteristic curve of the setpoint intake manifold pressure and to ascertain the associated setpoint crankshaft position.

Subsequently, the associated characteristic feature in the characteristic curve of the actual intake manifold pressure and the associated actual crankshaft position are ascertained.

Subsequently, the absolute value of the difference of the ascertained setpoint and actual crankshaft positions is formed for the characteristic feature and checked against a specifiable threshold value.

If the absolute value of the difference exceeds the specifiable threshold value, a substitute reaction may be implemented by control unit 10. Possible substitute reactions are, for example, activation of the engine indicator light or activation of an emergency operating mode of internal combustion engine 1.

Since the deviation of the characteristic curve of the actual intake manifold pressure from the characteristic curve of the setpoint intake manifold pressure correlates directly with the valve timing, it is thus possible to infer defects such as e.g. toothed belt aging, toothed belt jump, timing chain jump, timing chain lengthening or slow aging of the components. Thus it is possible to prevent defects of the internal combustion engine and to avoid deterioration of the emissions of internal combustion engine 1.

Alternatively or additionally, it is possible to ascertain a timing advance or timing retard of the valve timing from the sign of the difference of the two crankshaft positions. A positive sign of the difference indicates an advance of the valve timing, while a negative sign of the difference indicates a retard of the valve timing.

Alternatively, it is also possible to use a characteristic feature within the actual intake manifold pressure in order to ascertain the deviation.

Subsequently, the method may be continued from the start in step 500.

Figure 3:
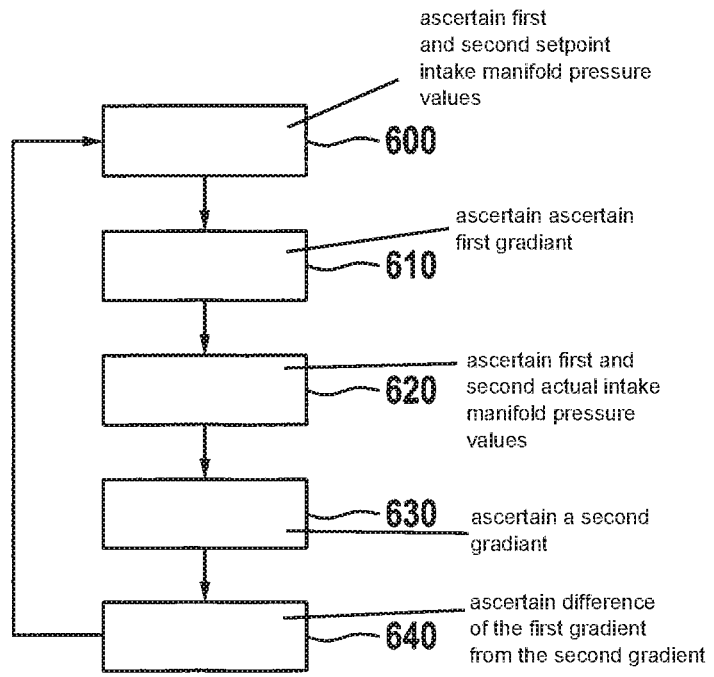
FIG. 3 shows a second exemplary embodiment of the sequence of the method for diagnosing the valve timing of an internal combustion engine.

FIG. 3 shows the exemplary sequence of the method for diagnosing the valve timing of an internal combustion engine 1 in a second exemplary embodiment.

In this alternative specific embodiment, the characteristic feature may be ascertained as a gradient.

In a first step 600, control unit 10 may ascertain and store a first and a second setpoint intake manifold pressure value for what may be two specifiable crankshaft angles. Alternatively, two successive crankshaft angles may be selected. The two values will be referred to below as the first and second crankshaft angles.

In a further step 610, control unit 10 ascertains and stores a first gradient by division of a difference of the second setpoint intake manifold pressure value from the first setpoint intake manifold pressure value and the difference of the second crankshaft angle from the first crankshaft angle.

In a step 620, control unit 10 ascertains and stores a first actual intake manifold pressure value at the angle of the first crankshaft angle and a second actual intake manifold pressure value at the angle of the second crankshaft angle.

In a step 630, control unit 10 ascertains and stores a second gradient by division of the difference of the second actual intake manifold pressure value from the first actual intake manifold pressure value and the difference of the second crankshaft angle from the first crankshaft angle.

In a step 640, the absolute value of the difference of the first gradient from the second gradient is then ascertained by control unit 10 and checked against a specifiable threshold value.

If the absolute value of the difference exceeds the specifiable threshold value, a substitute reaction may be carried out by control unit 10. Possible substitute reactions are, for example, activation of the engine indicator light or activation of an emergency operating mode of internal combustion engine 1.

Subsequently, the method may be continued from the start in step 600.

What is claimed is:

1. A method for diagnosing a valve timing of an internal combustion engine, the method comprising:
    ascertaining an actual intake manifold pressure signal, the actual intake manifold pressure signal being ascertained by: (i) an intake manifold pressure sensor, or (ii) a hot film air mass sensor which models the actual intake manifold pressure signal as a function of a throttle valve position signal;
    ascertaining, by an electronic control unit, a characteristic curve of the actual intake manifold pressure signal as a function of a crankshaft signal;
    comparing, by the electronic control unit, the characteristic curve of the actual intake manifold pressure signal to a characteristic curve of a setpoint intake manifold pressure signal so as to determine a deviation of the characteristic curve of the actual intake manifold pressure signal from the characteristic curve of the setpoint intake manifold pressure signal;
    diagnosing, by the electronic control unit, a shift of the valve timing based on the deviation of the characteristic curve of the actual intake manifold pressure signal from the characteristic curve of the setpoint intake manifold pressure signal exceeding a specifiable deviation;
    based on diagnosing the shift of the valve timing, activating an engine indicator light or activating an emergency operating mode of the internal combustion engine;
    wherein the deviation of the characteristic curve of the actual intake manifold pressure signal from the characteristic curve of the setpoint intake manifold pressure signal is ascertained based on a characteristic feature of the characteristic curve of the actual intake manifold pressure signal and a characteristic feature of the characteristic curve of the setpoint intake manifold pressure signal, and includes:
    determining, from the characteristic curve of the actual intake manifold pressure signal, an actual crankshaft position associated with the characteristic feature of the characteristic curve of the actual intake manifold pressure signal;
    determining, from the characteristic curve of the setpoint intake manifold pressure signal, a setpoint crankshaft position associated with the characteristic feature of the characteristic curve of the setpoint intake manifold pressure signal;
    wherein the deviation of the characteristic curve of the actual intake manifold pressure signal from the characteristic curve of the setpoint intake manifold pressure signal is determined based on a deviation of the actual crankshaft position from the setpoint crankshaft position.

2. The method of claim 1, wherein the actual intake manifold pressure signal is ascertained by the intake manifold pressure sensor.

3. The method of claim 1, wherein the actual intake manifold pressure signal is modeled by the hot film air mass sensor as a function of the throttle valve position signal.

4. The method of claim 1, wherein each of the characteristic feature of the characteristic curve of the setpoint intake manifold pressure signal and the characteristic feature of the characteristic curve of the actual intake manifold pressure signal corresponds to a minimum and/or a maximum of the characteristic curve of the actual intake manifold pressure signal and of the characteristic curve of the setpoint intake manifold pressure signal, respectively.

5. The method of claim 1, wherein each of the characteristic feature of the characteristic curve of the setpoint intake manifold pressure signal and the characteristic feature of the characteristic curve of the actual intake manifold pressure signal corresponds to a gradient, as a function of the characteristic curve of the actual intake manifold pressure signal and of the characteristic curve of the setpoint intake manifold pressure signal, respectively.

6. The method of claim 1, wherein the internal combustion engine is switched to the emergency operating mode when the deviation is detected.

7. The method of claim 1, wherein the diagnosing is carried out in a steady-state or quasi-steady-state operating state.

8. The method as recited in claim 7, wherein the steady-state or quasi-steady-state operating state is an idling operating state of the internal combustion engine or a specifiable load state of the internal combustion engine.

9. The method as recited in claim 1, further comprising:
determining whether the shift in the valve timing is in an advance direction or in a retard direction, based on the deviation of the characteristic curve of the actual intake manifold pressure signal from the characteristic curve of the setpoint intake manifold pressure signal.

10. A non-transitory computer readable medium on which is stored a computer program, the computer program including program code for diagnosing a valve timing of an internal combustion engine, the program code, when executed by a processor, causing the processor to perform:
receiving, by the processor, an actual intake manifold pressure signal, the actual intake manifold pressure signal being received from: (i) an intake manifold pressure sensor, or (ii) a hot film air mass sensor which models the actual intake manifold pressure signal as a function of a throttle valve position signal;
ascertaining, by the processor, a characteristic curve of the actual intake manifold pressure signal as a function of a crankshaft signal;
comparing, by the processor, the characteristic curve of the actual intake manifold pressure signal to a characteristic curve of a setpoint intake manifold pressure signal so as to determine a deviation of the characteristic curve of the actual intake manifold pressure signal from the characteristic curve of the setpoint intake manifold pressure signal; and
diagnosing, by the processor, a shift of the valve timing based on the deviation of the characteristic curve of the actual intake manifold pressure signal from the characteristic curve of the setpoint intake manifold pressure signal exceeding a specifiable deviation; and
based on diagnosing the shift of the valve timing, activating, by the processor, an engine indicator light or activating an emergency operating mode of the internal combustion engine;
wherein the deviation of the characteristic curve of the actual intake manifold pressure signal from the characteristic curve of the setpoint intake manifold pressure signal is ascertained based on a characteristic feature of the characteristic curve of the actual intake manifold pressure signal and a characteristic feature of the characteristic curve of the setpoint intake manifold pressure signal, and includes:
determining, from the characteristic curve of the actual intake manifold pressure signal, an actual crankshaft position associated with the characteristic feature of the characteristic curve of the actual intake manifold pressure signal;
determining, from the characteristic curve of the setpoint intake manifold pressure signal, a setpoint crankshaft position associated with the characteristic feature of the characteristic curve of the setpoint intake manifold pressure signal;
wherein the deviation of the characteristic curve of the actual intake manifold pressure signal from the characteristic curve of the setpoint intake manifold pressure signal is determined based on a deviation of the actual crankshaft position from the setpoint crankshaft position.

11. The non-transitory computer readable medium of claim 10, wherein the actual intake manifold pressure signal is ascertained by an intake manifold pressure sensor.

12. The non-transitory computer readable medium as recited in claim 10, wherein the program code, when executed, by the processor, further causes the processor to perform:
determining whether the shift in the valve timing is in an advance direction or in a retard direction, based on the deviation of the characteristic curve of the actual intake manifold pressure signal from the characteristic curve of the setpoint intake manifold pressure signal.

13. A device for diagnosing a valve timing of an internal combustion engine, the device comprising:
an electronic control unit configured to:
receive an actual intake manifold pressure signal, the actual intake manifold pressure signal being received from: (i) an intake manifold pressure sensor, or (ii) a hot film air mass sensor which models the actual intake manifold pressure signal as a function of a throttle valve position signal;
ascertain a characteristic curve of the actual intake manifold pressure signal as a function of a crankshaft signal;
compare the characteristic curve of the actual intake manifold pressure signal to a characteristic curve of a setpoint intake manifold pressure signal so as to determine a deviation of the characteristic curve of the actual intake manifold pressure signal from the characteristic curve of the setpoint intake manifold pressure signal;
diagnose a shift of the valve timing based on the deviation of the characteristic curve of the actual intake manifold pressure signal from the characteristic curve of the setpoint intake manifold pressure signal; and
based on the diagnosing the shift of the valve timing, activating an engine indicator light or activating an emergency operating mode of the internal combustion engine;
wherein the deviation of the characteristic curve of the actual intake manifold pressure signal from the characteristic curve of the setpoint intake manifold pressure signal is ascertained based on a characteristic feature of the characteristic curve of the actual intake manifold pressure signal and a characteristic feature of the characteristic curve of the setpoint intake manifold pressure signal, and includes:
determining, from the characteristic curve of the actual intake manifold pressure signal, an actual crankshaft position associated with the characteristic feature of the characteristic curve of the actual intake manifold pressure signal;
determining, from the characteristic curve of the setpoint intake manifold pressure signal, a setpoint crankshaft position associated with the characteristic feature of the characteristic curve of the setpoint intake manifold pressure signal;
wherein the deviation of the characteristic curve of the actual intake manifold pressure signal from the characteristic curve of the setpoint intake manifold pressure signal is determined based on a deviation of the actual crankshaft position from the setpoint crankshaft position.

14. The device as recited in claim 13, wherein the electronic control unit is further configured to:
determine whether the shift in the valve timing is in an advance direction or in a retard direction, based on the deviation of the characteristic curve of the actual intake manifold pressure signal from the characteristic curve of the setpoint intake manifold pressure signal.

15. A method for diagnosing a valve timing of an internal combustion engine, the method comprising:
ascertaining an actual intake manifold pressure signal, the actual intake manifold pressure signal being ascertained by: (i) an intake manifold pressure sensor, or (ii)

a hot film air mass sensor which models the actual intake manifold pressure signal as a function of a throttle valve position signal;

ascertaining, by an electronic control unit, a characteristic curve of the actual intake manifold pressure signal as a function of a crankshaft signal;

comparing, by the electronic control unit, the characteristic curve of the actual intake manifold pressure signal to a characteristic curve of a setpoint intake manifold pressure signal so as to determine a deviation of the characteristic curve of the actual intake manifold pressure signal from the characteristic curve of the setpoint intake manifold pressure signal;

diagnosing, by the electronic control unit, a shift of the valve timing based on the deviation of the characteristic curve of the actual intake manifold pressure signal from the characteristic curve of the setpoint intake manifold pressure signal exceeding a specifiable deviation;

based on diagnosing the shift of the valve timing, activating an engine indicator light or activating an emergency operating mode of the internal combustion engine;

wherein the deviation of the characteristic curve of the actual intake manifold pressure signal from the characteristic curve of the setpoint intake manifold pressure signal is ascertained based on a characteristic feature of the characteristic curve of the actual intake manifold pressure signal and a characteristic feature of the characteristic curve of the setpoint intake manifold pressure signal, and includes:

ascertaining, from the characteristic curve of the setpoint intake manifold pressure signal, a first setpoint intake manifold pressure value for a first crankshaft angle, and a second setpoint intake manifold pressure value for a second crankshaft angle;

determining a first gradient based on a difference between the first setpoint intake manifold pressure value and the second setpoint intake manifold pressure value, and based on a difference between the first crankshaft angle and the second crankshaft angle;

ascertaining, from the characteristic curve of the actual intake manifold pressure signal, a first actual intake manifold pressure value at an angle of the first crankshaft angle, and a second actual intake manifold pressure value at an angle of the second crankshaft angle;

determining a second gradient based on a difference between the first actual intake manifold pressure value and the second actual intake manifold pressure value, and based on the difference between the first crankshaft angle and the second crankshaft angle;

wherein the deviation of the characteristic curve of the actual intake manifold pressure signal from the characteristic curve of the setpoint intake manifold pressure signal is determined based on a deviation of the first gradient from the second gradient.

\* \* \* \* \*